(12) United States Patent
Bermes et al.

(10) Patent No.: US 9,821,489 B2
(45) Date of Patent: Nov. 21, 2017

(54) CUT-LENGTH INDICATING DEVICE FOR A HAND POWER TOOL

(71) Applicant: Robert Bosch GmbH, Stuttgart (DE)

(72) Inventors: Christian Bermes, Rapperswil (CH); Sergio Miracco, Gerlafingen (CH)

(73) Assignee: Robert Bosch GmbH, Stuttgart (DE)

( * ) Notice: Subject to any disclaimer, the term of this patent is extended or adjusted under 35 U.S.C. 154(b) by 544 days.

(21) Appl. No.: 14/310,000

(22) Filed: Jun. 20, 2014

(65) Prior Publication Data

US 2015/0000142 A1 Jan. 1, 2015

(30) Foreign Application Priority Data

Jun. 28, 2013 (DE) .................. 10 2013 212 562

(51) Int. Cl.
  *B27B 9/02* (2006.01)
  *B23D 59/00* (2006.01)
(52) U.S. Cl.
  CPC .............. *B27B 9/02* (2013.01); *B23D 59/002* (2013.01)
(58) Field of Classification Search
  CPC .... B27B 9/00; B27B 9/02; B27B 9/04; B27B 17/00–17/14; B27B 19/0014
  USPC ........... 30/293, 166.3, 369–519; 83/520, 521
  See application file for complete search history.

(56) References Cited

U.S. PATENT DOCUMENTS

| | | | | |
|---|---|---|---|---|
| 5,285,708 A | * | 2/1994 | Bosten | B23D 33/12 362/89 |
| 5,375,495 A | * | 12/1994 | Bosten | B23D 33/12 30/388 |
| 5,461,790 A | * | 10/1995 | Olstowski | B23Q 17/24 30/390 |
| 5,967,645 A | * | 10/1999 | Anderson | B25H 7/04 362/259 |
| 6,878,954 B2 | * | 4/2005 | Butler | B23D 59/002 250/559.29 |
| 6,976,764 B2 | * | 12/2005 | Cheng | B23D 59/003 362/259 |
| 7,207,251 B2 | * | 4/2007 | Ushiwata | B23D 59/003 83/468.3 |
| 7,347,133 B2 | * | 3/2008 | Cheng | B23D 59/003 83/520 |
| 7,556,401 B2 | * | 7/2009 | Smith | B23D 59/003 362/253 |
| 8,616,102 B2 | * | 12/2013 | Koegel | B23D 59/003 83/102.1 |
| 8,667,877 B2 | * | 3/2014 | Marinov | G02B 7/1825 83/468.3 |

(Continued)

FOREIGN PATENT DOCUMENTS

DE   10 2008 046 705 A1   3/2010
DE   10 2012 219 397 A1   1/2014

*Primary Examiner* — Jason Daniel Prone
*Assistant Examiner* — Richard Crosby, Jr.
(74) *Attorney, Agent, or Firm* — Maginot, Moore & Beck LLP

(57) ABSTRACT

A cut-length indicating device for a hand power tool includes at least one guide unit configured to moveably guide at least one movably mounted and electrically operated indicating element. The device also includes at least one electric power supply unit configured to supply electric current to the at least one indicating element. The at least one guide unit and the at least one electric power supply unit are configured so as to be partially integral with each other.

10 Claims, 4 Drawing Sheets

(56) References Cited

U.S. PATENT DOCUMENTS

| | | | |
|---|---|---|---|
| 9,162,298 B2* | 10/2015 | Chiang | B23D 59/003 |
| 9,242,304 B2* | 1/2016 | Martin | B23D 59/006 |
| 2002/0131267 A1* | 9/2002 | Van Osenbruggen | B23D 59/003 362/109 |
| 2003/0233921 A1* | 12/2003 | Garcia | B23D 59/003 83/520 |
| 2006/0042444 A1* | 3/2006 | Ushiwata | B23D 59/003 83/581 |
| 2006/0230894 A1* | 10/2006 | Meredith | B23D 45/048 83/13 |
| 2007/0034065 A1* | 2/2007 | Chang | B23D 59/003 83/520 |
| 2009/0158907 A1* | 6/2009 | Chiang | B23D 59/003 83/520 |
| 2009/0313831 A1* | 12/2009 | Patel | B23D 45/122 30/123 |
| 2011/0265625 A1* | 11/2011 | Lawlor | B23D 59/003 83/520 |
| 2012/0255414 A1* | 10/2012 | Koegel | B23D 59/003 83/477.2 |
| 2013/0247737 A1* | 9/2013 | Chen | B23D 59/003 83/471.3 |
| 2014/0047720 A1* | 2/2014 | Vitantonio | B23D 49/006 30/369 |
| 2015/0122526 A1* | 5/2015 | Bernardi | B26B 7/00 173/213 |

* cited by examiner

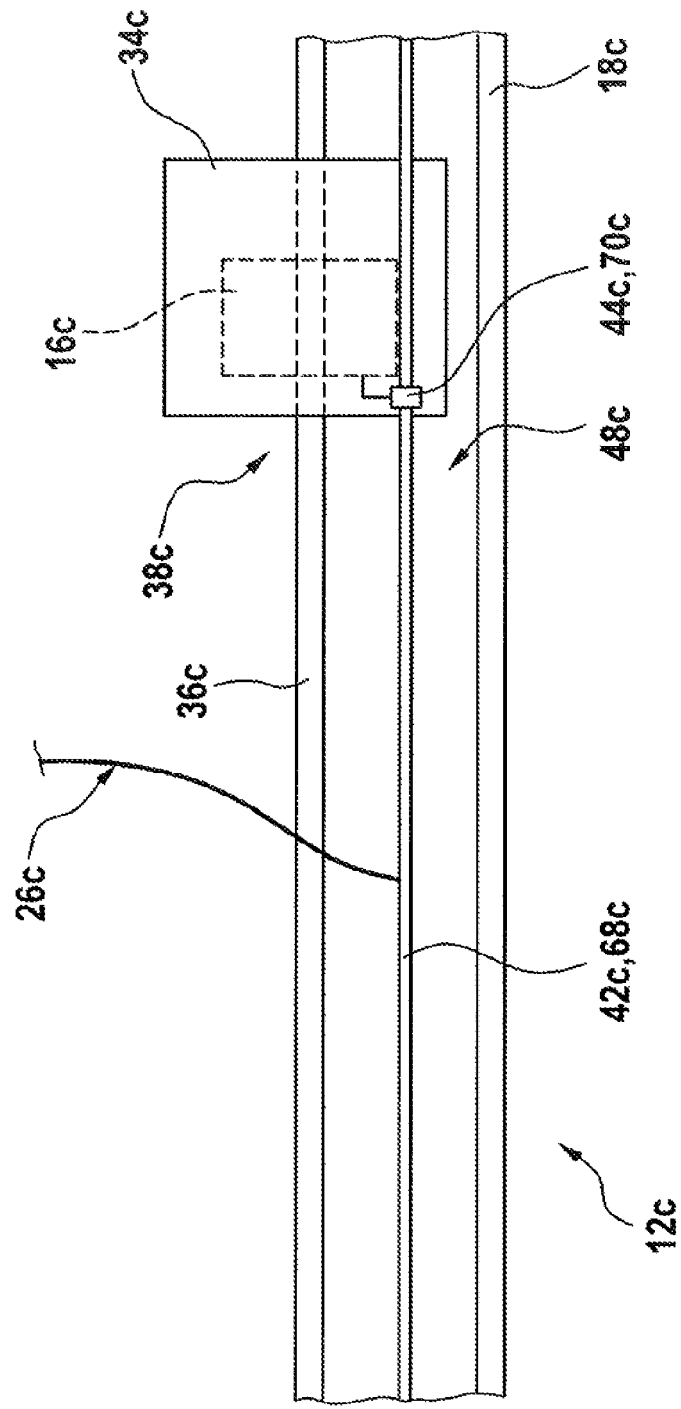

CUT-LENGTH INDICATING DEVICE FOR A HAND POWER TOOL

This application claims priority under 35 U.S.C. §119 to patent application number DE 10 2013 212 562.3, filed on Jun. 28, 2013 in Germany, the disclosure of which is incorporated herein by reference in its entirety.

BACKGROUND

There has already been proposed a cut-length indicating device for a hand power tool, comprising at least one guide unit for movably guiding at least one movably mounted and electrically operated indicating element, and comprising at least one electric power supply unit for supplying electric current to the at least one indicating element. The power tool indicating device is realized as a cut-length indicating device of a plunge-cut circular saw.

SUMMARY

The disclosure is based on a cut-length indicating device for a hand power tool, comprising at least one guide unit for movably guiding at least one movably mounted and electrically operated indicating element, and comprising at least one electric power supply unit for supplying electric current to the at least one indicating element.

It is proposed that the guide unit and the electric power supply unit be realized so as to be partially integral with each other.

A "cut-length indicating device" is to be understood to mean, in particular, a device for indicating at least one cut length of a tool of a hand power tool, in particular a cut length that can be set in a variable manner by the user. In particular, the hand power tool is realized as a plunge-cut circular saw, in which a tool constituted by a saw blade is fully accommodated inside a housing when in a non-operative state. An "electric power supply unit" is to be understood to mean, in particular, a unit that comprises at least one power source unit, for providing an electric operating current, and at least one current conduction unit for conducting the operating current to at least one load element. A "power source unit" is to be understood to mean, in particular, a unit that provides an operating current, wherein the power source unit may be realized, for example, as a battery unit, accumulator battery unit, an external connection for the battery current, or as a transformer unit that transforms a mains current into the operating current. A "current conduction unit" is to be understood to mean, in particular, a unit comprising current conduction element, in particular cable elements and/or elements that conduct the current, for example inductively, over an intermediate space, which conducts the operating current from the power source unit to the load element, in particular to the at least one indicating element. In particular, the operating current is constituted by an extra-low voltage (ELV), in which a voltage is maximally 25 volts alternating-current voltage, preferably maximally 12 volts alternating-current voltage, or maximally 60 volts direct-current voltage, or preferably maximally 30 volts direct-current voltage. An "indicating unit" is to be understood to mean, in particular, a unit having tactile, acoustic or optical indicating elements. Preferably, the indicating elements are realized as optical indicating elements, and particularly preferably as laser indicating elements. A "guide unit" is to be understood to mean, in particular, a unit that is provided to guide movably mounted indicating elements on a defined path and that, in particular, has at least one guide element, which is movably mounted and disposed on the at least one indicating element. In particular, the guide unit may comprise at least one linear guide element, which is realized, for example, as a guide rod element, along which there slides a guide element carrying indicating element. Moreover, the guide unit may comprise a movement coupling unit, which couples together movement of a plurality of guide elements. That the "guide unit and the electric power supply unit be realized so as to be partially integral with each other" is to be understood to mean, in particular, that at least one element of the guide unit, in particular a guide element or a linear guide element, is realized as a current conduction element of the electric power supply unit.

The configuration of the cut-length indicating device according to the disclosure makes it possible, in particular, to dispense with a so-called floating cabling, in which electric power cables, which supply electric current to movably mounted indicating elements, are carried along as movably mounted indicating elements are moved during operation, as a result of which points of contact between the electric power cables and movably mounted indicating elements, in particular soldered connection points, are subjected to a high degree of mechanical load. Thus, advantageously, a service life of the cut-length indicating device can be increased.

Furthermore, it is proposed that the at least one electric power supply unit have at least one sliding-action contact unit, which connects the at least one indicating element to a power source unit. A "sliding-action contact unit" is to be understood to mean, in particular, a unit having at least one contact element, which is preferably realized as a stationary element, and at least one sliding element, which sweeps over the contact element, the contact element and the sliding element being realized as electrically conducting elements. Preferably, the at least one sliding element of the sliding contact unit is integrally constituted from a moving element of the guide unit, and/or the at least one contact element is constituted by a stationary element of the guide unit. In particular, an electrical connection of the indicating element to the electric power supply unit can be achieved with technically simple implementation.

Furthermore, it is proposed, that the at least one guide unit have at least one linear guide element, which is realized as a stationary contact element of the sliding-action contact unit. In particular, the at least one linear guide element is connected to a power source unit via a cable element of the electric power supply unit. In particular, a stationary element of the guide unit can be used as a current conduction element, such that an electric power connection for supplying electric current, in particular at a point of a soldered connection between a cable element and the linear guide element, is realized so as to be particularly durable.

Moreover, it is proposed that the at least one guide unit have at least one plain bearing bush element, which is guided on the linear guide element and which is realized as a sliding element of the sliding-action contact unit. A "plain bearing bush element" is to be understood to mean, in particular, a bush that slides on the linear guide element, and that is realized as a guide element on which the indicating element is disposed, or that directly carries the indicating element. That "the plain bearing bush element is conductively connected to the at least one indicating element" is to be understood to mean, in particular, that the plain bearing bush element is realized so as to be electrically conductive and is connected to an electric power connector of the at least one indicating element. In particular, the plain bearing bush element is connected to one end of a connecting wire element of a guide element, which is connected, by another end, to the electric power connector of the at least one indicating element. In particular, an electrical connection of the indicating element to the electric power supply unit can be achieved with technically simple implementation.

Furthermore, it is proposed that the at least one guide unit comprise at least one spring element, which applies a spring force to the at least one indicating element and to at least one further indicating element, and which is realized as a sliding element of the sliding-action contact unit. In particular, the spring element applies a spring force to guide elements on which the at least one indicting element and the at least one further indicating element are disposed. In particular, the spring element is provided to couple together a movement of the indicating elements, in order that tolerances and/or play of the cut-length indicating device can be compensated. In particular, simultaneous supply of electric current to at least two indicating elements can be achieved with the use of an already existing element.

Furthermore, it is proposed that the at least one sliding-action contact unit have at least one spring plate element, which is realized as a stationary contact element and on which the spring element slides. In particular, it is possible to achieve a sliding-action contact unit that is easily realized in respect of its construction.

Furthermore, it is proposed that the at least one sliding-action contact unit have at least one eye element, which is realized as a stationary contact element and on which the spring element slides. An "eye element" is to be understood to mean, in particular, an element that has at least one electrically conducting ring element, that surrounds the spring element in at least one partial region, and has contact with the spring element. An electrical conductivity of the eye element may be achieved, for example, by producing the eye element from an electrically conducting material or by application of an electrically conductive coating. In particular, it is possible to achieve a sliding-action contact unit that is easily realized in respect of its construction.

Moreover, it is proposed that the at least one sliding-action contact unit have at least one groove, which is realized as a stationary contact element and which has an electrically conducting coating. Preferably, the groove is realized in a housing of the hand power tool. Preferably, the at least one indicating element, or a guide element of the guide unit that carries the at least one indicating element, comprises at least one stud element that, as a sliding-action contact unit, slides in the groove and is guided in the latter for the purpose of guiding the indicating element. In particular, it is possible to achieve a sliding-action contact unit that is easily realized in respect of its construction.

Furthermore, it is proposed that the cut-length indicating device have at least one switching unit, which is provided to effect a time-dependent interruption of the electric power supply. A "switching unit" is to be understood to mean, in particular, a unit having at least one switching element for closing an electric circuit, the switching unit preferably having ancillary electronics that switch the switching element after the expiry of a defined timespan, in order to interrupt the electric power supply. A "time-dependent interruption" is to be understood to mean, in particular, a switch-off after a predefined timespan. In particular, the time-dependent interruption of the electric power supply is provided to protect a power source unit against unintentional operation in open circuit. Alternatively, the switching unit may have only one switching element, and permanently close the electric circuit after actuation of the switching element or switch-on of the hand power tool. In particular, a power saving cut-length indicating device can be achieved.

Additionally proposed is a hand power tool, in particular a plunge-cut circular saw, having a cut-length indicating device according to the disclosure.

The cut-length indicating device according to the disclosure is not intended in this case to be limited to the application and embodiment described above. In particular, the cut-length indicating device according to the disclosure may have individual elements, components and units that differ in number from a number stated herein, in order to fulfill a principle of function described herein.

BRIEF DESCRIPTION OF THE DRAWINGS

Further advantages are given by the following description of the drawings. The drawings show three exemplary embodiments of the disclosure. The drawings and the description contain numerous features in combination. Persons skilled in the art will also expediently consider the features individually and combine them to create appropriate further combinations.

In the drawings:

FIG. 4 shows a further alternative configuration of a cut-length indicating device according to the disclosure, having a conductively coated groove as a contact element of the sliding-action contact unit.

DETAILED DESCRIPTION

Figure 1:
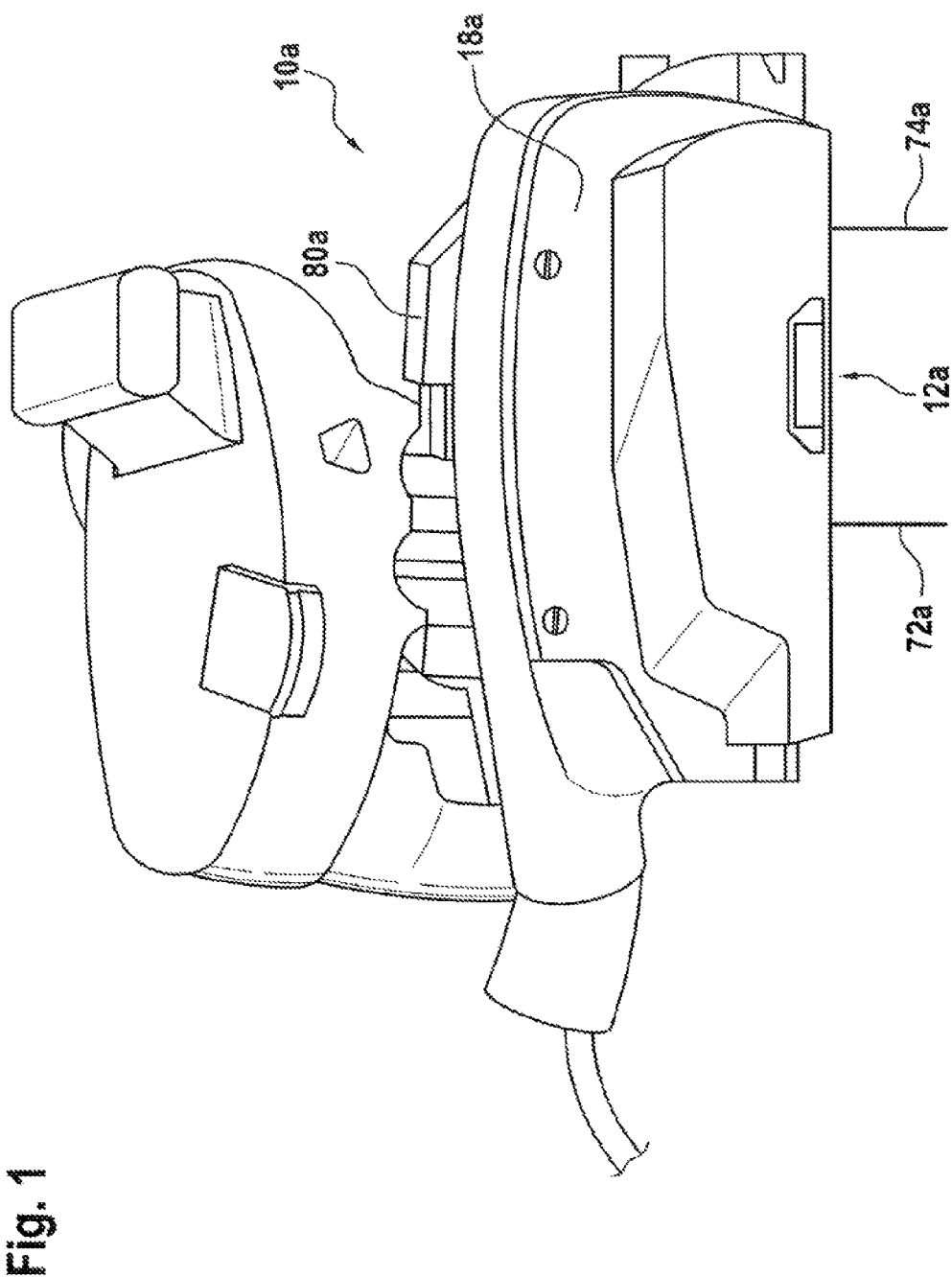
FIG. 1 shows a hand power tool having a cut-length indicating device according to the disclosure.

FIG. 1 shows a portion of a hand power tool 10a that is known in principle, realized as a plunge-cut circular saw, which comprises a housing 18a and which has a cut-length indicating device 12a. The cut-length indicating device 12a generates two laser beams 72a, 74a, which mark a cut length of a circular saw blade of the hand power tool 10a. The hand power tool 10a additionally has a cut-depth setting unit 80a, by means of which an extension depth of the circular saw blade, not represented, and thus a cut depth of the plunge-cut circular saw, can be set. The cut depth is likewise used to set the cut length. A representation of the hand power tool 10a is restricted to the components relevant to the disclosure, such that substantially the housing 18a of the hand power tool is represented.

Figure 2:
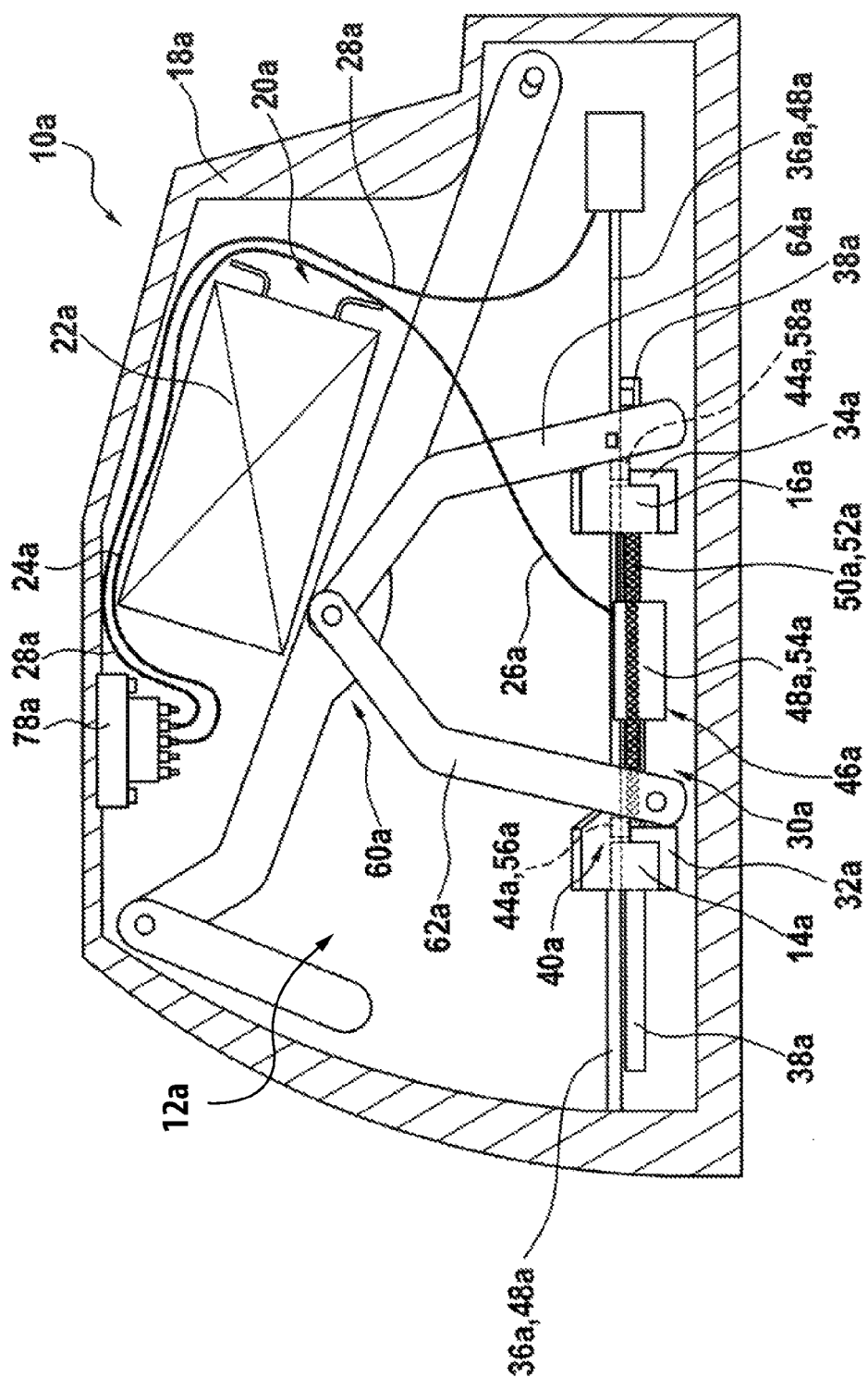
FIG. 2 shows a more detailed representation of the cut-length indicating device according to the disclosure.

The cut-length indicating device 12a comprises a guide unit 30a, for movably guiding two movably mounted and electrically operated indicating elements 14a, 16a, and an electric power supply unit 20a, for supplying electric current to the indicating elements 14a, 16a (FIG. 2). The indicating elements 14a, 16a are realized as laser indicating elements constituted by laser diodes and, when supplied with electric current, generate the laser beams 72a, 74a to indicate the cut length. The indicating elements 14a, 16a are mounted on guide elements 32a, 34a, realized as slides, that are guided by means of plain bearing bush elements 56a, 58a on a linear guide element 36a realized as a linear guide rod. The indicating elements 14a, 16a are guided by the linear guide element 36a, in a guide recess 38a in the housing 18a that is parallel to the linear guide element 36a. The guide unit 30a additionally has a movement coupling unit 60a, having two movement coupling elements 62a, 64a, which are pivotally connected to each other and coupled to the guide elements 32a, 34a. The movement coupling unit 60a is coupled to the cut-depth setting unit 80a, such that, via the movement coupling unit, setting of the cut depth causes the indicating elements 14a, 16a to be moved according to the cut depth, and thus according to the cut length, such that edge positions of the circular saw blade are indicated by the indicating elements 14a, 16a as soon as the latter are supplied with electric current. Alternatively, the movement coupling unit 60a could be coupled to an extension unit of the circular saw blade and made to move upon extension of the circular saw blade of the hand power tool 10a, which is accommodated in the housing 18a when in a non-operative state, and could move the guide elements 32a, 34a in accordance with an extended distance of the circular saw blade, such that the cut length of the circular saw blade is indicated by the indicating elements 14a, 16a. The guide unit 30a comprises a spring element 52a, which applies a spring force to the at least one indicating element 14a and to the at least one further indicating element 16a, and which for this purpose is connected to the guide elements 32a, 34a. Compensation of play of the indicating elements 14a, 16a is achieved by means of the spring element 52a.

The electric power supply unit 20a comprises a power source unit 22a, realized as a battery pack, which supplies the indicating elements 14a, 16a with an extra-low voltage of 3V d.c. The guide unit 30a and the electric power supply unit 20a are realized so as to be partially integral with each other. The electric power supply unit 20a has sliding-action contact units 40a, 46a, which connect the indicating elements 14a, 16a to the power source unit 22a. The sliding-action contact units 40a, 46a are realized so as to be partially integral with elements of the guide unit 30a. The linear guide element 36a of the guide unit 30a is realized as a stationary contact element 42a of the sliding-action contact unit 40a. The plain bearing bush elements 56a, 58a guided on the linear guide element 36a are realized as sliding elements 44a of the sliding-action contact unit 40a. The plain bearing bush elements 56a, 58a are connected to the indicating elements 14a, 16a by means of connecting wires on the guide elements 32a, 34a. The linear guide element 36a is fixedly connected to the power source unit 22a via a cable element 28a of the electric power supply unit 20a, a switching unit 78a and a further cable element 24a. The plain bearing bush elements 56a, 58a and the linear guide element 36a are composed of an electrically conductive metal. An electric circuit 76a, in which the indicating elements 14a, 16a are connected to the power source unit 22a, is closed via a second sliding-action contact unit 46a, which has a spring plate element 54a, realized as a stationary contact element 48a, on which there slides the spring element 52a, which is realized as a sliding element 50a of the sliding-action contact unit 46a. The spring plate element 54a is fixedly connected to the power source unit 22a via a cable element 26a. In the case of the guide unit 30a and the electric power supply unit 20a being realized so as to be partially integral, all cable elements 24a, 26a, 28a of the electric power supply unit 20a are connected to stationary elements, and moving parts of the electric power supply unit 20a are constituted by elements of the guide unit 30a. Upon movement of the indicating elements 14a, 16a, therefore, there is especially little loading of soldered connection points at which the cable elements 24a, 26a, 28a are connected to the stationary elements. The switching unit 78a is provided for time-dependent interruption of the electric power supply, and for this purpose has ancillary electronics comprising a timer.

Figure 3:
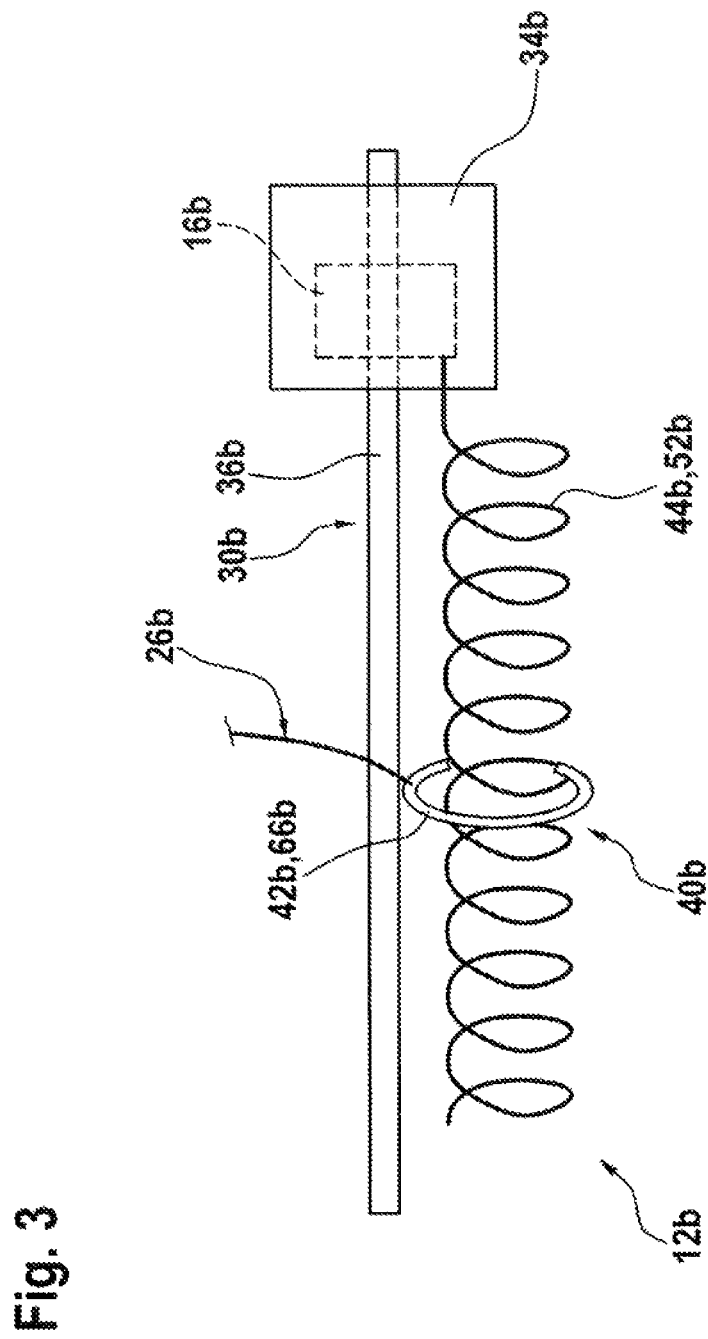
FIG. 3 shows an alternative configuration of a cut-length indicating device according to the disclosure, having a sliding-action contact unit realized as a spring-eye unit.

Two further exemplary embodiments of the disclosure are shown in FIGS. 3 and 4. The descriptions that follow and the drawings are each limited substantially to the differences between the exemplary embodiments, and in principle reference may also be made to the drawings and/or to the description of the other exemplary embodiments, in particular of FIGS. 1 and 2, in respect of components having the same designation, in particular relating to components having the same references. To distinguish the exemplary embodiments, the letter a has been appended to the references of the exemplary embodiment in FIGS. 1 and 2. In the exemplary embodiments of FIGS. 3 and 4, the letter a has been replaced by the letters b to c.

FIG. 3 shows an alternative realization of a cut-length indicating device 12b, the representation being limited substantially to a schematic representation of a sliding-action contact unit 40b, the structure of which differs from that of the previous exemplary embodiment. The sliding-action contact unit 40b has an eye element 66b, realized as a stationary contact element 42b, on which there slides a spring element 52b realized as a sliding element 44b of the sliding-action contact unit 40b. The eye element 66b is realized as a conductive metal ring, running within which is the spring element 52b, the spring element 52b having contact with an inner surface of the eye element 66b. The eye element 66b is supplied with electric current via a cable element 26b of an electric power supply unit 20b. The spring element 52b is connected to an indicating element 16b, which is mounted on a guide element 34b of a guide unit 30b. The guide element 34b is guided on a linear guide element 36b of the guide unit 30b.

In a further alternative configuration of a cut-length indicating device 12c according to the disclosure, having a guide unit 30c and an electric power supply unit 20c, which are realized so as to be partially integral with each other, a sliding-action contact unit 40c has at least one groove 68c, realized as a stationary contact element 42c, which has an electrically conducting coating (FIG. 4). As in the previous figure, a representation is limited substantially to a schematic representation of a sliding-action contact unit 40c. The groove 68c is realized in a housing 18c, and is parallel to a linear guide element 36c of a guide unit 30c, guided on which there is a guide element 34c on which an indicating element 16c is mounted. A stud 70c, which engages in the groove 68c and which is realized as a sliding element 44c of the sliding-action contact unit 40c, is mounted on the guide element 34c. The stud 70c is connected to the indicating element 16c. The electrically conducting coating of the groove 68c is supplied with electric current via a cable element 26c of an electric power supply unit 20c.

What is claimed is:

1. A cut-length indicating device for a hand power tool including a housing, comprising:
   an indicating unit including at least one electrically operated indicating element:
   at least one guide unit including at least one guide rod and at least one guide element, the at least one guide rod fixedly connected to the housing and the at least one guide element movably mounted on the at least one guide rod and fixedly connected to the at least one indicating element, the at least one guide element configured to moveably guide the at least one indicating element relative to the housing on the at least one guide rod; and
   at least one electric power supply unit configured to supply electric current to the at least one indicating element, wherein the at least one guide element is a current conduction element, such that to supply the electric current to the at least one indicating element the electric current flows from the at least one electric power supply unit, through the at least one guide element, and to the at least one indicating element.

2. The cut-length indicating device for a hand power tool according to claim 1, further comprising:
at least one sliding-action electrical contact unit configured for sliding movement relative to the housing and further configured to connect electrically the at least one guide element to the at least one electric power supply unit.

3. The cut-length indicating device for a hand power tool according to claim 2, wherein:
the at least one guide rod is configured as a stationary electrical contact element that is electrically connected to the at least one electric power supply unit, and
the at least one moveably mounted guide element is electrically connected to the least one guide rod.

4. The cut-length indicating device for a hand power tool according to claim 3, wherein the at least one guide unit further includes at least one plain bearing bush element guided on the at least one guide rod and fixedly connected to the at least one moveably mounted guide element.

5. The cut-length indicating device for a hand power tool according to claim 4, further comprising:
at least one switching unit configured to effect a time-dependent interruption of electric power from the at least one electric power supply unit to the at least one indicating element.

6. The cut-length indicating device for a hand power tool according to claim 5, wherein the at least one guide unit further includes at least one spring element configured to apply a spring force to the at least one indicating element and to at least one further indicating element.

7. The cut-length indicating device for a hand power tool according to claim 6, further comprising:
at least one spring plate element configured as a stationary contact element, and
the at least one spring element is configured to slide on the at least one spring plate element.

8. The cut-length indicating device for a hand power tool according to claim 6, further comprising:
at least one eye element configured as a stationary contact element, and
the at least one the spring element is configured to slide on the at least one eye element.

9. The cut-length indicating device for a hand power tool according to claim 2, further comprising:
at least one groove configured as a stationary electrical contact element, the at least one groove having an electrically conducting coating.

10. A hand power tool, comprising:
a housing; and
a cut-length indicating device, including:
an indicating unit including at least one electrically operated indicating element,
at least one guide unit including at least one guide rod and at least one guide element, the at least one guide rod fixedly connected to the housing and the at least one guide element movably mounted on the at least one guide rod and fixedly connected to the at least one indicating element, the at least one guide element configured to moveably guide the at least one indicating element relative to the housing on the at least one guide rod; and
at least one electric power supply unit configured to supply electric current to the at least one indicating element,
wherein the at least one guide element is a current conduction element, such that to supply the electric current to the at least one indicating element the electric current flows from the at least one electric power supply unit, through the at least one guide element, and to the at least one indicating element.

* * * * *